United States Patent [19]

Horton

[11] 4,192,583
[45] Mar. 11, 1980

[54] SOLAR RECEIVER HELIOSTAT REFLECTOR HAVING A LINEAR DRIVE AND POSITION INFORMATION SYSTEM

[75] Inventor: Richard H. Horton, Schenectady, N.Y.

[73] Assignee: The United States of America as represented by the United States Department of Energy, Washington, D.C.

[21] Appl. No.: 844,403

[22] Filed: Oct. 21, 1977

[51] Int. Cl.² .............................................. G03B 21/00
[52] U.S. Cl. ....................................... 353/3; 350/289; 126/425
[58] Field of Search ................ 126/270, 271; 350/292, 350/289, 299; 353/3; 310/12, 13, 4

[56] References Cited

U.S. PATENT DOCUMENTS

| | | | |
|---|---|---|---|
| 1,976,428 | 10/1934 | Arthuys et al. | 353/3 |
| 3,109,113 | 10/1963 | Baudot | 310/13 |
| 3,151,285 | 9/1964 | Rainey | 310/13 X |
| 3,292,065 | 12/1966 | Fredrickson | 310/12 |
| 3,713,727 | 1/1973 | Markusian | 126/271 X |
| 4,034,737 | 7/1977 | Kume | 350/299 X |

Primary Examiner—Harry N. Haroian
Attorney, Agent, or Firm—R. V. Lupo; Roger S. Gaither; Clifton E. Clouse, Jr.

[57] ABSTRACT

A heliostat for a solar receiver system comprises an improved drive and control system for the heliostat reflector assembly. The heliostat reflector assembly is controllably driven in a predetermined way by a lightweight drive system so as to be angularly adjustable in both elevation and azimuth to track the sun and efficiently continuously reflect the sun's rays to a focal zone, i.e., heat receiver, which forms part of a solar energy utilization system, such as a solar energy fueled electrical power generation system. The improved drive system includes linear stepping motors which comprise low weight, low cost, electronic pulse driven components. One embodiment comprises linear stepping motors controlled by a programmed, electronic microprocessor. Another embodiment comprises a tape driven system controlled by a position control magnetic tape.

24 Claims, 11 Drawing Figures

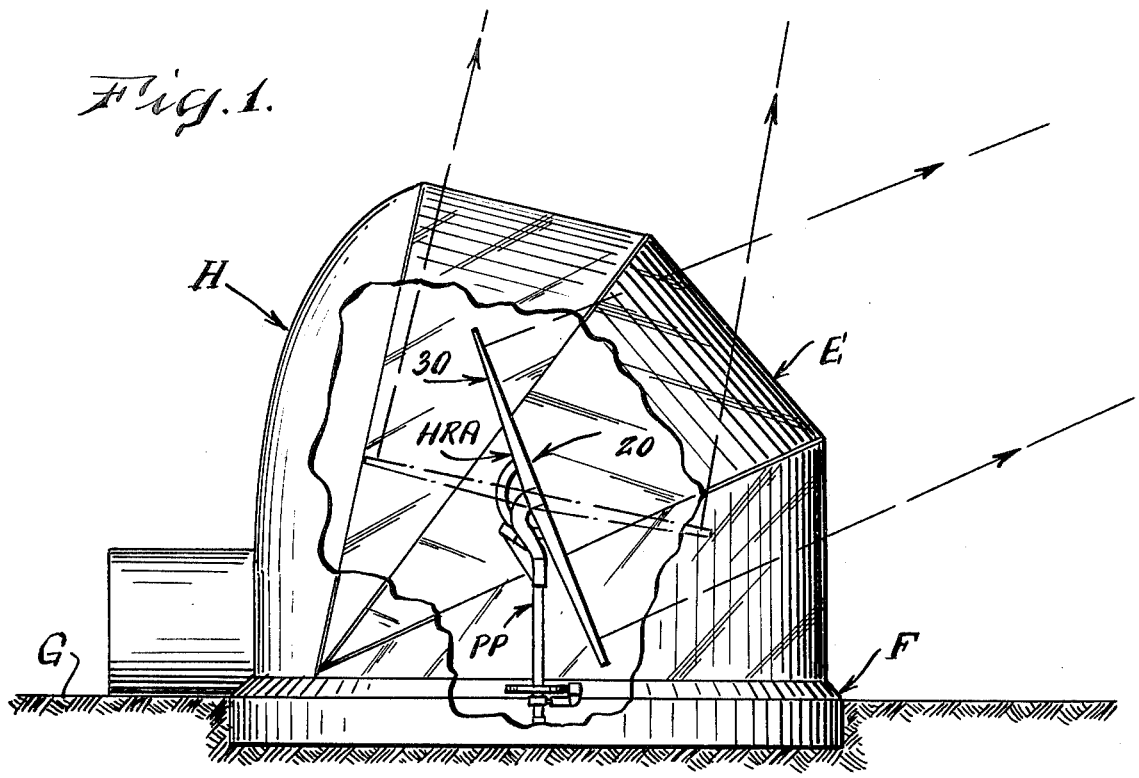
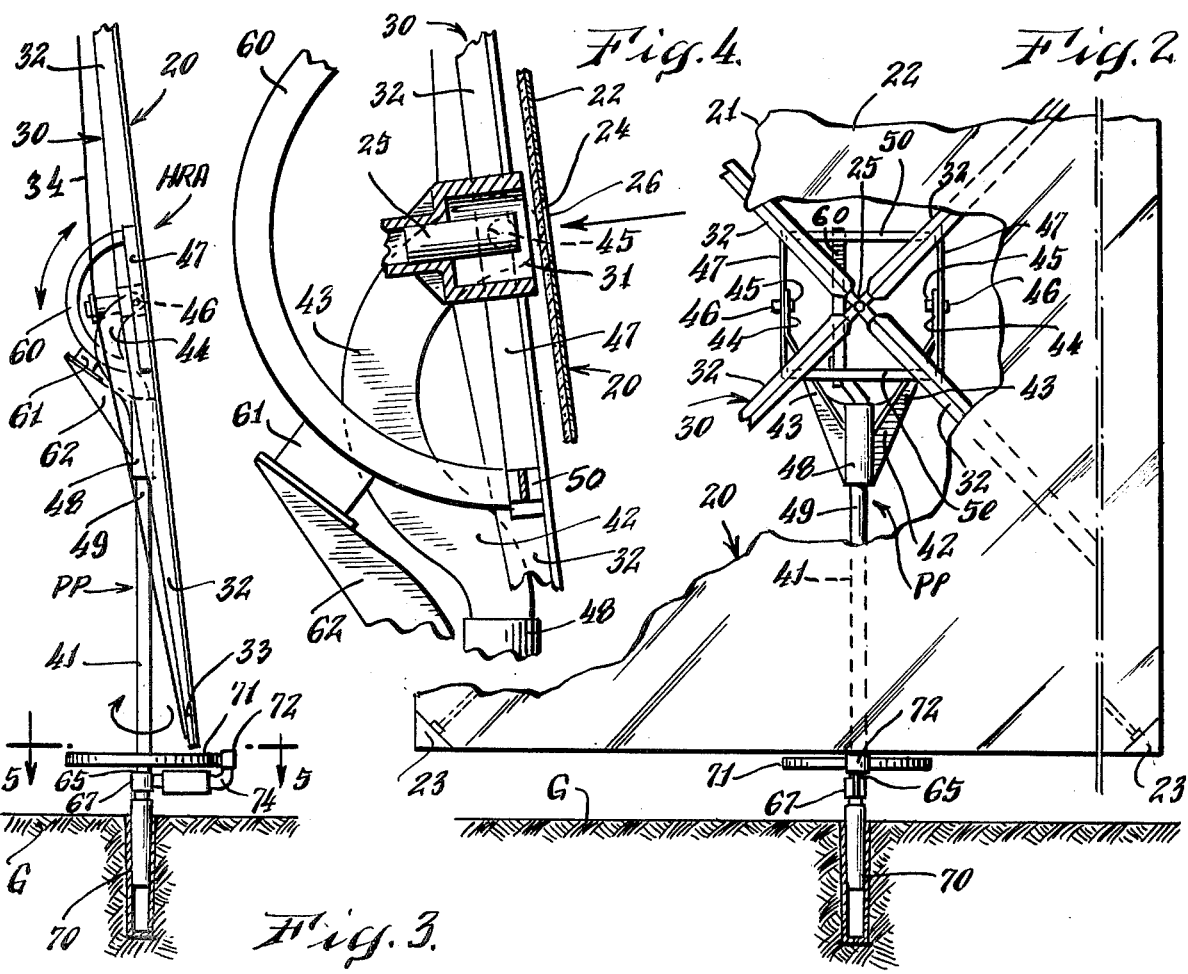

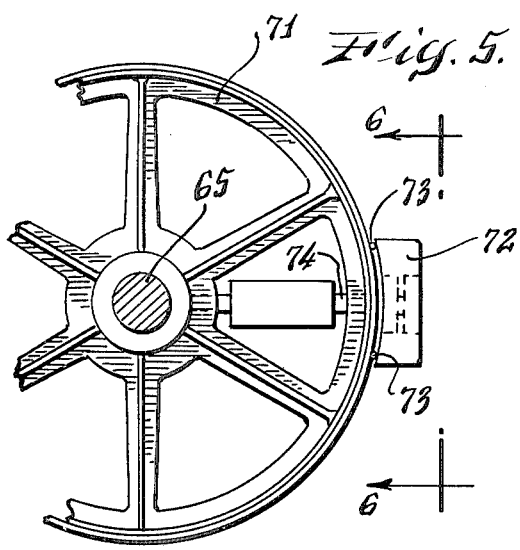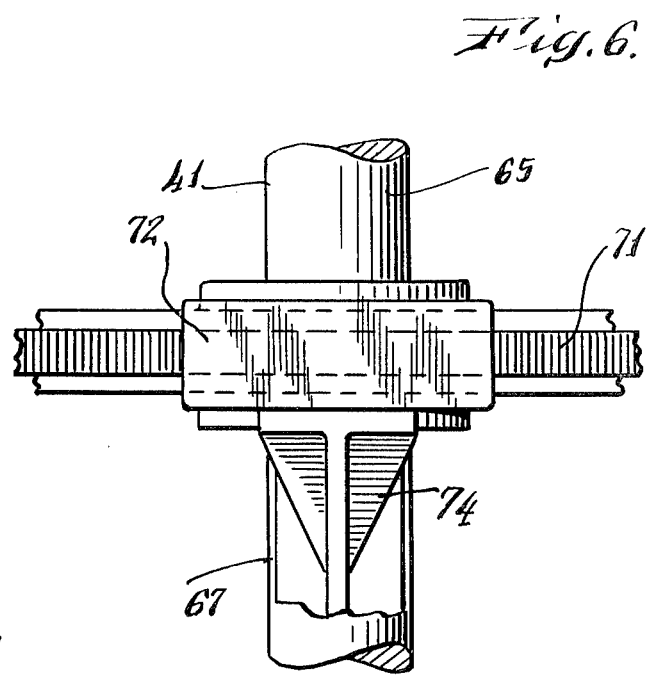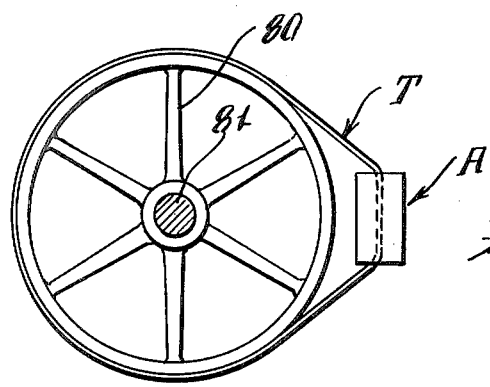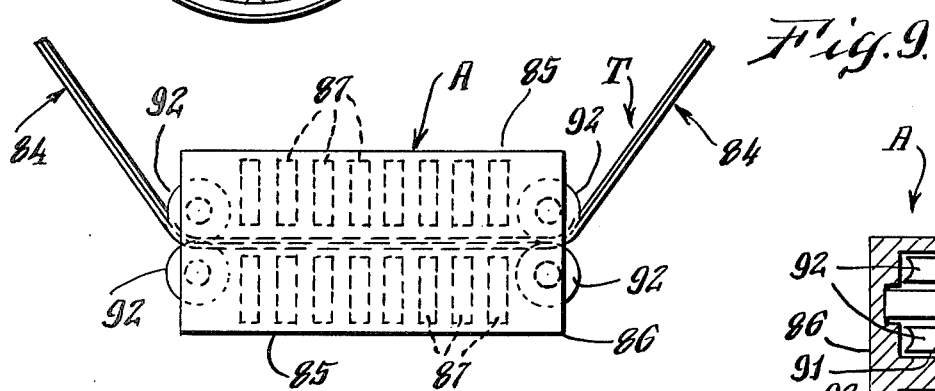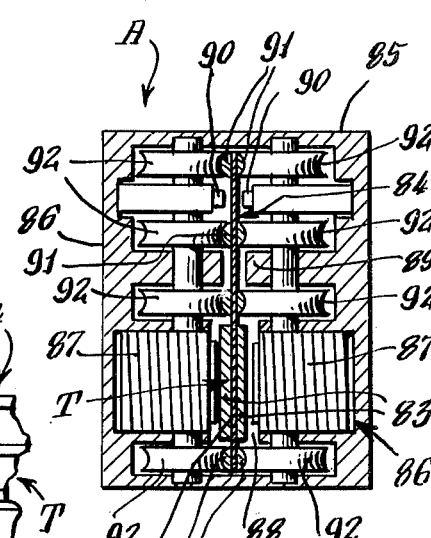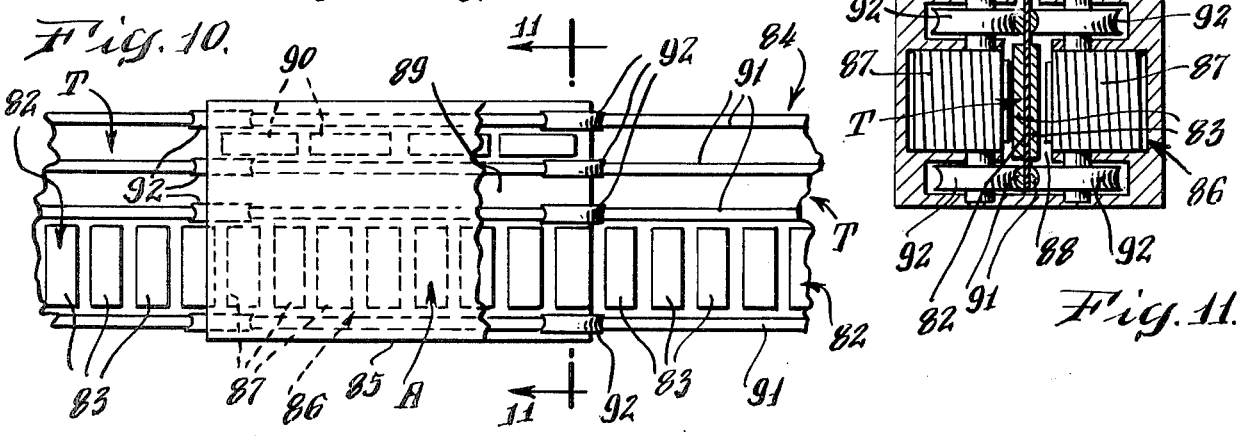

SOLAR RECEIVER HELIOSTAT REFLECTOR HAVING A LINEAR DRIVE AND POSITION INFORMATION SYSTEM

BACKGROUND OF THE INVENTION

The invention relates generally to solar energy utilization systems and particularly to an improved heliostat which admirably lends itself to incorporation into a solar receiver system, which may form part of a solar energy electrical power generation system.

It seems to be commonly assumed or agreed that one of the most pressing problems facing the nation at this time in history is that of energy and, more particularly, locating feasible energy sources that are economically competitive alternatives to traditional fuels, such as fossil fuels. There has been much research and development effort and activity directed at the development of solar central receiver electrical power generation systems. In one such system, a large field or array of individually driven and controlled mirror-like devices forming parts of heliostats reflect the sun's rays to a common, focal, heat absorbing zone, i.e., the central receiver, which may be part of a boiler/superheater. The central receiver is a target for the reflected sun's rays, which are highly concentrated at the central receiver and may be collected at high temperatures in excess of 500 degrees Centigrade and subsequently used through known systems, such as steam-turbine driven electrical generating plants, to produce electricity or otherwise to provide thermal energy for other systems. Both government and industry recognize that before a solar energy electrical power generating system becomes a practical reality, it must be economically feasible, i.e., the cost of generation of a unit of electricity must be in a cost range that is comparable to or better than that of contemporary electrical power generating systems. Studies have indicated that the cost of heliostats is the largest factor in the overall cost of such a system. It has been concluded that the development of an operationally acceptable heliostat which lends itself to ease of manufacture in quantity production, ready shipment to site, easy assembly and installation at site, and low cost maintenance over the expected life of the system, is highly desirable. Such an improved heliostat must produce a significant reduction in initial cost and maintenance costs over the prospective life of the system.

SUMMARY OF THE INVENTION

A heliostat is a device which includes an optical reflective surface that is appropriately mounted, driven and controlled so as to continuously track the sun during the course of the day and reflect the sun's rays to the central receiver. Although a complete heliostat comprises an assembly of components which includes the reflective surface, support structure therefor, a drive and control system therefor, and a means to protect particularly the reflective surface from injurious environmental conditions, such as wind, sand, snow and rain, likely to be encountered at the site of installation, this invention deals primarily with the provision of improved heliostat reflector drive and control systems, and some closely related heliostat components, which permit and contribute to the design of an overall improved heliostat.

Heliostat reflector systems according to the invention herein are extremely simple, light-weight, use cost effective materials, made of few parts, lend themselves to low cost mass production techniques, minimize shipping problems to the installation site and lend themselves to easy installation at the site with minimum labor. The aforesaid attributes provide an extremely low initial cost heliostat. My inventive drive and control systems are particularly well suited for use with the improved reflector assembly based on the "stretch-frame" concept disclosed and claimed in the copending application of J. J. Zdeb and myself. That concept contemplates the provision of a stretchable, polygonal sheet of plastic material, preferably Mylar, one side of which is capable of reflecting the sun's rays, that is selectively stretchably mounted on an adjustable frame comprised of a central hub and a plurality of radially extending, spoke-like beams, the radially outer ends of which engage peripheral portions of the sheet and are arranged selectively to tension and position the sheet to stretch it into a condition of optical flatness.

Such an extremely light-weight heliostat reflector assembly constructed in accordance with that invention lends itself to being supported by a simple pipe pedestal assembly, and driven by my low cost, light weight, drive and control systems disclosed and claimed herein which can be mass produced and operate on electronic position pulse counting techniques. Further, all elements of my improved drive and control systems can be factory installed and mounted on the pedestal-frame assemblies.

A heliostat incorporating my improved drive and control systems is well suited to be protected by an enclosure of the inflated plastic bubble type disclosed and claimed in another copending application of J. J. Zdeb and myself.

Some known drive systems employ two rotating motor drives which are directly applied through gear trains to horizontal and vertical axis components of the heliostat drive-frame system. These drive systems require high torque due to heavy structures, such as the conventional heavy reflectors, frames, and gear trains. My improved drive systems contemplate low weight, low cost, electronic pulse driven components, which may be of the plug-in type.

In one embodiment, my improved drive system employs linear stepping motors, which are highly accurate, permit electronic position pulse counting techniques to be used and eliminate the need for gear reducers. With such a drive system, I employ a programmed, self-calibrating, open loop control system, including a mass produced electronic microprocessor with each heliostat that calculates the individual reflector angle required and provides pulse data to the azimuth and elevation motors. A single low cost computer, located at a control station positioned away from the heliostats, generates sun angle data and transmits it to each heliostat microprocessor by modulation of a carrier signal superimposed on a power line.

In another embodiment of my invention, I employ a tape driven system for driving the reflector in both azimuth and elevation directions, combined with a position control magnetic tape that is programmed to feed electronic coded signals to either stop or start the tape drive system.

OBJECT OF THE INVENTION

It is an object of the invention to provide light-weight, inexpensive heliostat reflector drive and control systems that lend themselves to low cost mass production techniques and shipping procedures, simple installation and easy maintenance.

It is a further object of the invention to provide improved drive and control systems for a heliostat reflector assembly operating on the stretch frame concept, that is, one which includes a plastic sheet that is stretched into a condition of optical flatness and has one light reflecting side. Desirably the assembly further includes a built-in optical alignment system.

It is a still further object of the invention to provide improved light-weight heliostat drive and control systems that lend themselves to being supported on a simple pipe pedestal assembly for a reflector assembly, and to being factory installed and mounted on the pedestal assembly components.

It is another object of the invention to provide improved light-weight heliostat drive and control systems that incorporate linear stepping motor drives.

Other and more particular objects of the invention will in part be obvious and will in part appear from a perusal of the following description of the preferred embodiments and the claims, taken together with the drawings.

DRAWINGS

FIG. 1 is a side elevational view of a heliostat reflector assembly installed for operation on site within a protective enclosure, with portions of the enclosure broken away and showing the reflector assembly in one representative operational position in solid lines and in another representative position to which it may be adjusted in dot-dash lines.

FIG. 2 is a front elevational view of a square heliostat reflector having a frame with four beams mounted on a pipe pedestal, with portions broken away to show some structural details of the reflector supporting and driving means.

FIG. 3 is a side elevational view of the FIG. 2 assembly looking from the left in FIG. 2, showing by schematic arrows the directions of azimuth and elevational angle movement.

FIG. 4 is an enlarged sectional view taken substantially in a vertical plane passing through the center of the reflector-frame assembly of FIG. 2.

FIG. 5 is an enlarged fragmentary sectional view taken substantially on line 5—5 of FIG. 3.

FIG. 6 is an enlarged view taken substantially on line 6—6 of FIG. 5.

FIG. 8 is a view similar to FIG. 5 of a modified drive system.

FIG. 9 is an enlarged fragmentary view of the tape and actuator therefor of the FIG. 8 system.

FIG. 10 is an elevational view of the FIG. 9 structure looking from the bottom of FIG. 9.

FIG. 11 is a sectional view substantially taken on line 11—11 of FIG. 10.

DESCRIPTION OF PREFERRED EMBODIMENTS

Figure 7:
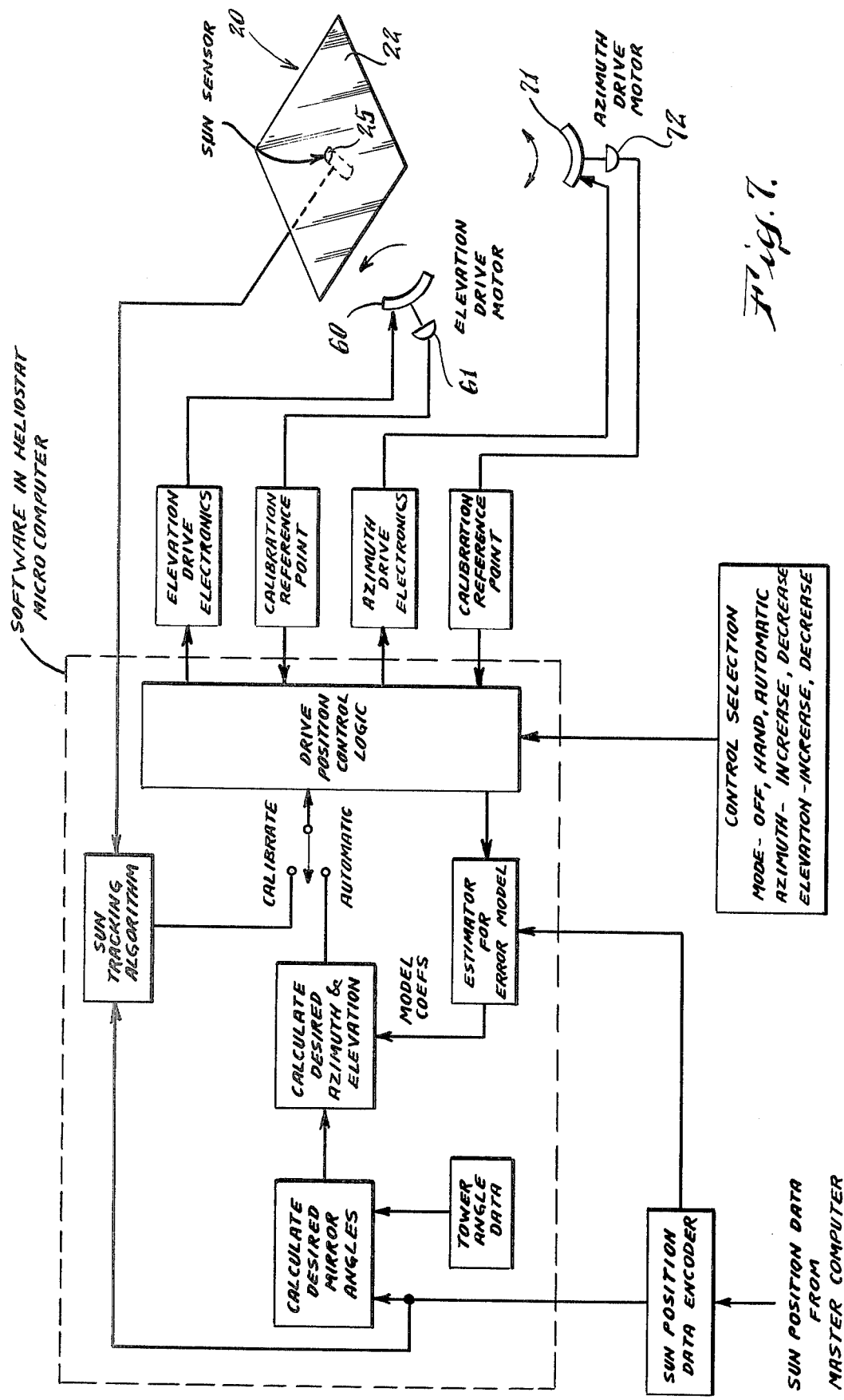
FIG. 7 is a diagrammatic view showing schematically the heliostat open loop control system with sun tracking calibration.

FIG. 1 illustrates a heliostat H comprising a heliostat reflector assembly HRA mounted on a pipe pedestal assembly PP and enclosed within a protective enclosure E supported by a foundation F mounted in the ground G at the heliostat site. The illustrated heliostat reflector assembly HRA forms no specific part of my invention being disclosed and claimed herein as it is based on the reflector stretch-frame concept disclosed and claimed in the copending application of J. J. Zdeb and myself, Ser. No. 844,400, filed concurrently herewth. The illustrated protective enclosure E and its foundation F form no specific part of my invention being disclosed and claimed herein as they are disclosed and claimed in a copending application of J. J. Zdeb and myself, Ser. No. 844,401, filed concurrently herewith.

Although the illustrated stretch-frame heliostat reflector assembly concept HRA does not constitute a specific part of my invention, my improved drive and control systems are extremely well suited to drive and control a light-weight, reflector-frame assembly, such as one embodying the stretch-frame concept. Therefore, my invention will be disclosed as associated with that type of reflector assembly, and an understanding of the latter is helpful in understanding my invention. However, it should be clearly understood that my invention is not limited to use with a stretch-frame reflector assembly, but is suitable for use with any light-weight heliostat reflector assembly which may be supported on a pipe pedestal assembly.

One embodiment of my invention is shown in FIGS. 1-6. In FIG. 2 there is illustrated a representative reflector 20 comprising a polygonal sheet 21, which is shown as square solely for the purpose of illustration. The sheet 21, which conveniently may be precut at the factory, is made of a stretchable material, preferably a stretchable plastic film, Mylar being well suited. One side 22 of the sheet 21 is formed so as to be light reflective. This can be effected by forming a silvered or aluminized face on the side 22 of sheet 21. The corners 23 of the sheet 21 are reinforced, as by the application of additional material or rigid plastic or metal corner structures, to facilitate attachment of tensioning devices carried by the reflector supporting frame for stretching the sheet 21 into a condition where the reflective side 22 is optically flat. Reflector 20 is mounted on a frame 30 in a manner so as to be selectively tensioned and positioned by the frame 30 into a condition where the side 22 of reflector sheet 21 is optically flat. The frame 30 is constructed and operates on the "stretch-frame concept" disclosed and claimed in the referred-to copending application. As illustrated, frame 30 includes a rigid central hub 31 and four radial spoke-like beams 32 secured at their radially inner ends to hub 31 and extending radially outward therefrom. At their radially outward ends, they carry tensioning devices 33 that are operationally associated with the corners 23 of the reflector sheet 21 and arranged to selectively tension and position the sheet into a condition whereby its side 22 is optically flat. A guy wire 34 may be provided to counter-balance any load set up in the reflector sheet 21 by the tensioning devices 33.

Because the assembled reflector-frame assembly is light-weight, it may be mounted on a light-weight support, such as pipe pedestal assembly PP, which essentially comprises a plurality of vertically axially aligned cooperating pipe members. The lowest pipe member is securely mounted in the ground G, and the pipe pedestal assembly PP provides a secure support for the stretch-frame assembly. Selective angular adjustment of the reflector stretch-frame assembly in both elevation and azimuth angle is provided by my improved drive and control systems which are of light-weight construction and supported by the pipe pedestal assembly PP.

The pipe pedestal assembly PP essentially comprises an elongated, vertically extending, upper pipe 41 which rigidly carries yoke 42 at its upper end and is rotatably mounted at its lower end 65 in a lower pipe section 67. Yoke 42 pivotally supports stretch frame 30 at its central area on a horizontal axis. Yoke 42 comprises a pair of inclined yoke leg portions 43 which diverge upwardly and extend into straight parallel leg portions 44 which, in turn, support aligned bearings 45. The frame 30 in its central area has a pair of spaced, parallel and generally vertically extending mounting bars 47, each of which is rigidly secured to and between a pair of adjacent beams 32. The mounting bars 47 are disposed contiguous with and outboard of yoke leg portions 44, and carry a pair of aligned bearing pins 46 which are rotatably received in the bearings 45. The arrangement is such that the mounting bars 47, and the frame 30 to which they are rigidly attached, are pivotally mounted on yoke 42 on the horizontal axis formed by aligned bearing pins 46-bearings 45, whereby the angle of elevation of the frame is adjustable selectively, as will subsequently be described. The bottom portion of the yoke 42 has a socket formation 48 which is press fit onto the upper end 49 of the upper pipe 41 to effect the rigid connection of the yoke on the upper pipe.

As described, the yoke 42 supports the stretch frame 30 at its central area on a horizontal axis for pivotal movement. The rigid connection of the mounting bars 47 to the beams 32, and the rigid connection of a pair of horizontally extending, vertically spaced strengthening bars 50 to adjacent beams 32 provide a strong, central, cage-like support for the stretch frame 30.

With reference to FIGS. 2-6, the first embodiment of my improved drive and control system will be described. A semicircular drive wheel 60, forming a part of the drive and control system for the reflector-frame assembly 30, is carried by the frame 30 by being rigidly secured to the support bars 50, (see FIG. 4). Drive wheel 60 extends vertically (see FIG. 2) and has its axis, coincident with the aforementioned horizontal axis formed by bearing pins 46-bearings 45. It is operatively associated with a linear stepping drive motor 61 which is rigidly carried by a central leg 62 of the yoke 42. The operational arrangement of the drive wheel 60 and drive motor 61 is such as to provide for selective adjustment of the elevation angle of the stretch frame 30, and the reflector 20 which it carries, by controlled actuation of the drive motor. The drive motor 61 is arranged and controlled to cause the drive wheel to move incrementally relative to the drive motor, and thereby incrementally rotate about the aforementioned horizontal axis in a controlled manner to angularly move the reflector-frame assembly in elevation.

The remainder of the pipe pedestal assembly PP and the system for driving the reflector-frame assembly to adjust its azimuth angle will now be described with particular reference to FIGS. 2, 3, 5 and 6. The lower end 65 of the upper pipe 41 is aligned with and rotatably mounted in the lower pipe 67 for controlled angular adjustment relative to it. The lower pipe 67 is rigidly secured in a mating mounting pipe 70 which is driven into the ground G and therefore is stationary. A circular drive wheel 71 is securely attached to and carried by the upper pipe 41 at its lower end 65. A linear stepping drive motor 72 is rigidly attached to and mounted at the upper end of the lower pipe 67, as by support bracket 74, radially outboard of and in operational relationship to the drive wheel 71. The arrangement is such that the upper pipe 41 may be selectively rotatably driven about its vertical axis by the drive motor 72, which drives the drive wheel 71 in a controlled manner to selectively adjust it, the upper pipe 41 and the reflector-frame assembly, to thereby selectively adjust the azimuth angle of the latter.

It will be understood that linear stepping motors are available and known. Therefore, their detailed construction and operation are not set forth. I have selected linear stepping drive motors that employ large wheels for leverage. In view of the lightness of the reflector-frame assembly which they drive, only low torque is required and it effectively may be provided by the linear stepping drive motor-drive wheel concept I employ to thereby eliminate the need for gear trains and their consequent disadvantages. Further, linear drive motors respond to and can be controlled by digital pulse information in a reliable and demonstrable way and, therefore, eliminate the need for continuous position feedback.

In view of the foregoing, it will be understood that the reflector-frame assembly HRA is mounted by the pipe pedestal assembly PP for: (1) selective rotation about a horizontal axis to selectively change its elevational angle and (2) selective rotation about a vertical axis, whereby its azimuth angle may be selectively changed. Of course, composite changes in elevation and azimuth may be simultaneously effected, and this may be continuously effected by a control system in a predetermined manner to cause the reflector-frame assembly to track the sun throughout and during its daily travel. A control system for achieving such operation will now be described.

With reference to FIG. 7 there will be seen a detailed block diagram which represents the basic operation of the control system. The system operates in two modes, "automatic" and "calibrate," as commanded from a central computer control via a power line communication link, the control signal being superimposed on the power line.

In the "automatic" mode, the system operates in the "open loop" steering mode. Field sun angle information transmitted from the central computer is used with the heliostat positional data stored in the microcomputer to calculate the azimuth and elevation angles required to reflect the sun on the target. The reflective side of the reflector 20 is then moved by the linear stepping drive motors 61 and 72 to the calculated angular positions.

In the "calibrate" mode, the system operates independently of the open loop steering mode. In this mode, a two-axis sun sensor 25 located in the reflector frame hub 31 perpendicular to the plane of optical flatness of the reflective side 22 of the reflector sheet in alignment with a transparent central area 24 in the sheet formed by an uncoated area 26 of the reflective side 22, is servoed by the sun tracking algorithm in the microcomputer using the drive system to follow the sun for a one day period. During this interval, the servoed azimuth and elevational reflector angles will be compared to the calculated or measured sun position angles and processed by an error model estimator stored in the computer software. This error model will then be used to correct the calculated azimuth and elevation angles when the system is operating in the open loop mode. The calibrate mode will be used prior to the system start-up to correct for misalignments resulting from the installation of the heliostat system. Subsequent recalibration will be required due to component wear and/or geodetic disturbances. The manual alignment of the sun sensor with the reflector surface is the only manual operation required by the system prior to start-up and will be performed during the installation process.

Control information may be communicated to the heliostat microprocessor using a high frequency carrier which is superimposed over the heliostat 60 Hz power line, for powering the powered heliostat components, such as the drive motors. Frequency and/or phase modulation are employed to transmit either field sun angle data or control words that invoke calibration or normal operation control modes.

To track the sun, an algorithm within the microprocessor located at each heliostat calculates the required reflector orientation for each set of sun angles transmitted to the heliostat. The central receiver located in a tower is at an angle that is a fixed datum for each field position. The reflector angle is resolved into azimuth and elevation factors. Resultant angles are modified by the error estimator.

The microprocessor provides command pulses to the linear stepping drive motors to produce the required incremental changes in the drive wheels to effect the desired azimuth and elevation motion. These same pulses when referenced properly, provide the control system with continuous position feedback information. Although the drive wheels 60 and 71 have been described as wheels, it will be observed that the drive wheel 60 is semi-circular, so as to lend itself to structural incorporation into the reflector-frame assembly. The drive wheels have an outer layer of ferromagnetic material on their rims which is etched to provide the rotor poles for the motor. The inside surfaces of the motors 61 and 72 are milled to correspond to the curved surfaces of the rims of drive wheels 60 and 71, respectively. This type of motor has a normal force in the order of a magnitude larger than the tangential forces it provides. To prevent contact with the drive wheel rims, roller bearings are provided at the leading and trailing edges of the motor, and are configured to provide a desired air gap. In FIG. 5 these bearings forming a part of azimuth drive wheel motor 72 are designated 73. They are not specifically shown relative to the elevation drive wheel 60, because of the small scale illustration of the drive motor 61 in FIG. 3. In both cases, the mounting brackets 62, 74 for the drive motors 61 and 72, respectively, are designed to permit the motors to move a small amount to compensate for machining and bearing tolerances on the drive wheels. The drive wheels and rotor bars spacing is sized for positional accuracy of 0.0005 radians since the linear stepping motor moves only one-half step for each command pulse. Detent action is provided by the tangential force of the energized motor.

In addition to the "automatic" and "calibrate" control modes, manual controls are provided at each heliostat location. These controls are employed to align or test the drive mechanisms and for locking out the system if it is to be taken out of service. Suitable readout of reflector angular orientation and other test data can be provided.

The acquisition function of "beam on" will be initiated from the central computer control. Since all of the heliostats receive common sun angle data for open loop steering, it is anticipated that the beam "on" and "off" commands can be accomplished by providing appropriate sun angle data. Synthetic tracking is not differentiated from normal tracking by the heliostat control system. The central computer, however, uses a stored program to generate sun angles when the field sun tracker, if one is used, is inoperable. Offset pointing and shut down will be accomplished by providing each field segment of heliostats with its own discrete artificial sun angle data. Stowage is achieved by the use of a special code sun angle datum that directs all reflectors to identical azimuth direction. This prevents any heliostat reflector from being coincident with any other heliostat beam. With the foregoing comments in reference to the block diagram of FIG. 7, it is believed that the control operation can be understood by those skilled in the art.

In FIGS. 8-11, there is illustrated another embodiment of my invention, a highly effective drive and control system for a heliostat reflector that operates on a novel control-drive tape concept. This embodiment couples a linear drive tape coupled to a control position information tape. The drive tapes selectively individually drive both azimuth and elevation drive wheels to effect reflector angle adjustments. For simplicity in explanation, FIGS. 8-11 illustrate the drive and control of the azimuth drive wheel 80 mounted on a rotatably mounted pedestal pipe 81, but it should be understood that the same concept is employed in driving a semi-circular elevation drive wheel (not shown). This embodiment contemplates an integral, composite tape T including both a drive tape and a control tape, and a tape actuator A for controlling and driving the tape. It combines a linear drive tape 82 and the control tape 84 in a single composite tape T. The composite tape T comprises a strong endless belt of tough plastic material. The drive tape 82 is moved by a linear actuator motor 86 in either linear direction to effect rotation in either direction, such as a belt drive would impart. The control tape 84 controls the operation of the actuator motor. The drive tape 82 includes a plurality of soft iron segments 83 that are spaced and embedded in tape 82. The actuator motor 86 consists of a series of electromagnets 87 mounted in the actuator body 85 which are sequentially energized, as by a multi-phase oscillator, to create a travelling magnetic wave through the length of the actuator motor. Disposed in the air gap 88 in the actuator motor between the electromagnets 87 is the drive tape 82. As the electromagnets 87 are energized, as by the multi-phase oscillator, coil of the first electromagnet 87 receives a flow of current and its magnetic field is energized; this causes the soft iron segment 83 closest to it to assume a position of the shortest magnetic path beneath the poles of the energized electromagnet. This causes the tape to be moved in one direction to that position. Following in sequence, the coil of the second electromagnet 87 is then energized i.e., pulsed, causing the second soft iron segment to be pulled underneath its poles in like manner. The drive tape 82 is actuated in this manner. The rate of movement of the drive tape is a function of the frequency of the phase pulsing, and the force by which the drive tape is moved is a function of the magnetic field strength. The direction of drive tape movement can be reversed by changing the phasing of the electromagnets.

The control tape 84 comprises a part of composite tape T, but is a separate section from the drive tape 82. It comprises a magnetic tape that is separated from the drive tape by magnetic shield 89, for otherwise, its operation would be adversely effected by the magnetic field of the electromagnets 87. The control tape 84 comprises conventional magnetic tape that is programmed and read by conventional magnetic tape heads 90 disposed in the actuator body 85. The control tape 84 is programmed by feeding in electronic coding signals to indicate the exact positions at which it is desired to either stop or start the actuator motor to move the drive as desired. It can be programmed to give exact readout of the position of the drive tape at any time. It can be used to store the solar program and other memory data to be used in conjunction with the tracking and pointing control system.

Ridges or beads 91 are provided on the tape T and cooperate with rollers 92 to precisely guide the tape T through the air gap in the actuator body 85.

Each of the heliostat reflector drive and control systems provided by my invention satisfy all the objects of my invention. As will be apparent to those skilled in the art, various changes and modifications of the invention described herein can be made without departing from the spirit and scope of the invention which is limited only by the following claims.

I claim:

1. A heliostat for a solar energy system comprising:
   A. a reflector;
   B. means for supporting said reflector for bi-axial movement about a horizontal axis and a vertical axis whereby said reflector is capable of movement about said axes to have its elevation angle and azimuth angle changed,
   C. drive means for operating said supporting means for moving said reflector to adjust the angular disposition of said reflector in both elevation and azimuth comprising increment movement motor means, said motor means comprising a linear drive tape, and
   D. a position control tape for controlling the position of said linear drive tape.

2. A heliostat as defined in claim 1 which further include means for actuating said motor means.

3. A heliostat as defined in claim 1 wherein said motor means includes electronic pulse positioning components and operates by electronic pulse positioning techniques to effect incremental movement.

4. A heliostat as defined in claim 1 which further includes electronic pulsing control means for said motor means.

5. A heliostat as defined in claim 1 wherein said drive means includes a drive wheel having an etched ferromagnetic rim, and said motor means comprises a linear stepping motor operatively associated with said drive wheel.

6. A heliostat as defined in claim 1 wherein said linear drive tape and said position control tape are combined in a composite tape.

7. A heliostat as defined in claim 1 wherein said position control tape comprises a longitudinally extending magnetic tape section on one lateral side of said composite tape, and said linear drive tape comprises a longitudinally extending section on the other lateral side comprising a plurality of spaced soft iron segments embodied in said composite tape.

8. A heliostat as defined in claim 1 wherein said drive tape comprises a plurality of longitudinally spaced soft iron segments, and which further includes means for incrementally moving said drive tape including a plurality of sequentially energizable electromagnets operatively associated with said iron segments.

9. A heliostat as defined in claim 8 which further includes a multi-phase oscillator for sequentially energizing said electromagnets to cause the soft iron segment closest to an energized electromagnet to move in a predetermined manner.

10. A heliostat as defined in claim 9 which further includes control means for said oscillator in the form of a magnetic tape.

11. A heliostat as defined in claim 1 wherein said supporting means comprises a pipe, and said reflector is pivotally secured to said pipe.

12. A heliostat as defined in claim 11 wherein a drive wheel is rigidly secured to said reflector, and said pipe supports an increment movement motor positioned in operative association with said drive wheel, whereby the angular position of said reflector relative to said pipe may be selectively adjusted by activation of said motor.

13. A heliostat as defined in claim 12 wherein said motor comprises a linear stepping motor.

14. A heliostat as defined in claim 12 wherein said motor comprises a linear drive tape.

15. A heliostat as defined in claim 12 wherein said reflector is pivotal about a horizontal axis, whereby said reflector is adjustable angularly in elevation.

16. A heliostat as defined in claim 15 wherein said pipe is pivotally mounted for selective rotation about a vertical axis so as to permit adjustment of the azimuth angle of said reflector; an azimuth drive wheel is rigidly secured to said pipe, and a second increment movement motor is positioned in operative association with said azimuth drive wheel, whereby the azimuth angle of said reflector is adjustable by activation of said second increment motor.

17. A heliostat as defined in claim 16 wherein said increment motors are linear stepping motors.

18. A heliostat as defined in claim 16 wherein said increment motors comprise linear drive tapes.

19. A heliostat as defined in claim 1 wherein said supporting means comprises a pedestal including a pair of vertically axially aligned extending pipes; the lower pipe being installed in a fixed position in the ground; the upper pipe being rotationally supported on said lower pipe; the upper end of said upper pipe rigidly supporting a yoke; said reflector being pivotally secured to said yoke about a horizontal axis; an elevation drive wheel rigidly secured to said reflector; a selectively operated, increment movement motor supported on said upper pipe in operative association with said elevation drive wheel and arranged to angularly position said drive wheel and thereby fix the elevational angle of said reflector; an azimuth drive wheel rigidly secured to said upper pipe; and a selectively operated second increment movement motor supported on said lower pipe in operative association with said azimuth drive wheel and arranged to angularly position said azimuth drive wheel and thereby fix the azimuth angle of said reflector.

20. A heliostat as defined in claim 19 wherein said motors comprise linear stepping motors.

21. A heliostat as defined in claim 19 wherein said motors comprise linear drive tapes.

22. A heliostat as defined in claim 21 which further includes magnetic tapes respectively operatively associated with said drive tapes for controlling their positions.

23. A heliostat as defined in claim 22 wherein said respective associated drive tapes and magnetic tapes are combined in a composite tape.

24. A heliostat as defined in claim 1 wherein said reflector, supporting means and drive means are built up from light-weight components that are capable of being manufactured by mass produced techniques, shipped to a site and readily assembled for use.

* * * * *